UNITED STATES PATENT OFFICE.

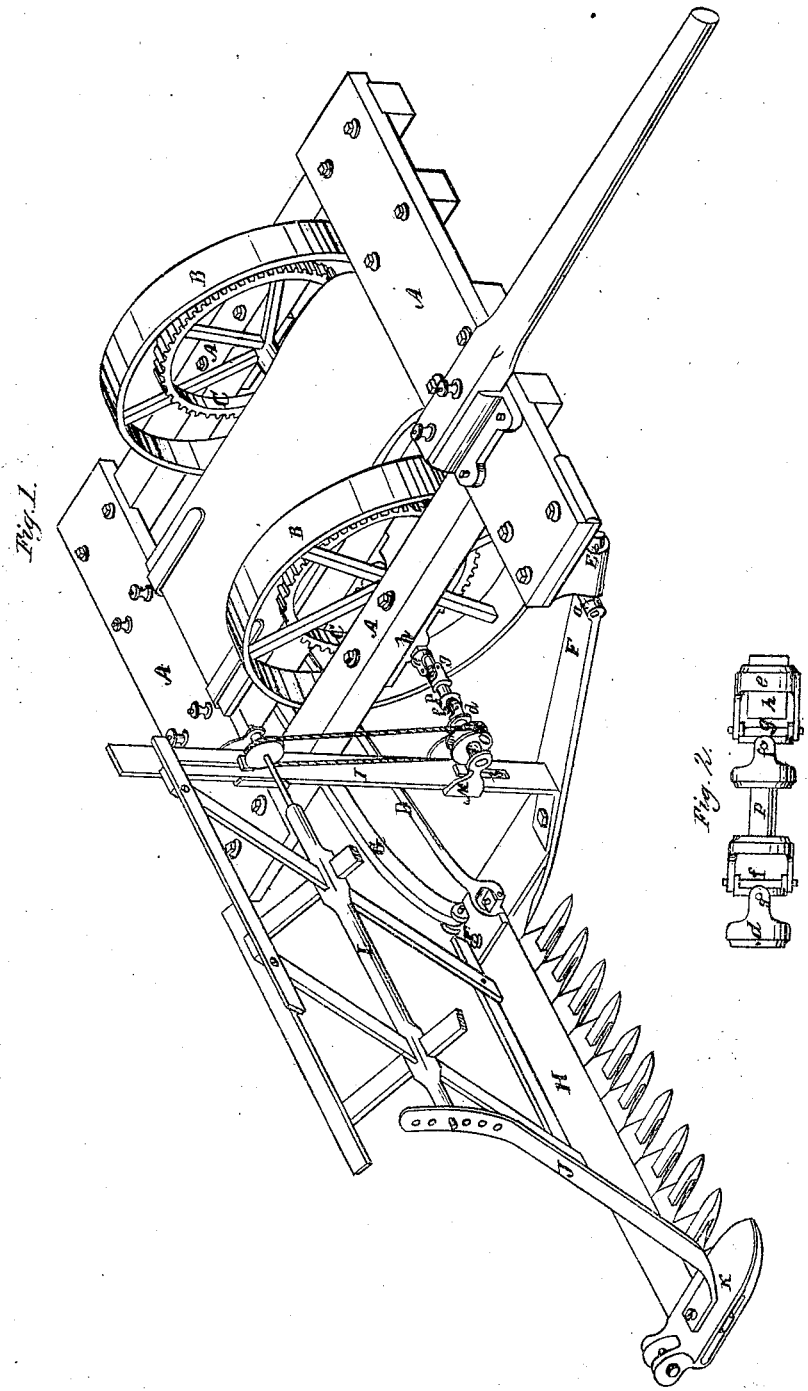

LEWIS MILLER, OF CANTON, OHIO.

IMPROVEMENT IN HARVESTING-MACHINES.

Specification forming part of Letters Patent No. 33,845, dated December 3, 1861.

*To all whom it may concern:*

Be it known that I, LEWIS MILLER, of Canton, in the county of Stark and State of Ohio, have invented certain new and useful Improvements in Harvesting-Machines; and I do hereby declare the following to be a full, clear, and exact description of the same, reference being had to the accompanying drawings, making a part of this specification, in which—

Figure 1 represents in perspective so much of a harvesting-machine as will illustrate my invention; and Fig. 2 represents on an enlarged scale a side view of a toggle coupling-link, by which the reel is driven quickly from the main axle of the machine, and allowed to rise and fall with the platform or finger-bar, independently of the main frame.

The reels of harvesting-machines are almost invariably driven by motion derived from the main driving and supporting wheels or their axles; and in machines where the finger-bar is hinged to the main frame and has a rising and falling motion independent of said main frame, the mechanism by which motion is transmitted across this joint, and said finger-bar, platform, and reel allowed to rise and fall without throwing off or slackening the belt, has been complicated, and not altogether reliable or desirable.

There are two prerequisites in the construction and operation of a reel. First, it must be adjustable, so that it may be made to operate equally well upon short or long straw; and, second, it must turn with certainty when the machine is cutting, else the straw will hang and clog on the cutters, or not be properly drawn into them and carried back over the finger or onto the platform.

The object and purpose of my invention is to make a simple connection between the main axle and the reel-shaft that will be flexible enough to allow the reel to move with the hinged finger-bar or platform, and rigid enough to insure the working of the reel whenever and as soon as the cutters are set in motion; and the nature of my invention consists in the use of a toggle-link between the end of the main supporting-axle and the end of a pulley-shaft, whence the reel is driven by belt or otherwise, so that the reel may, in rising and falling, and in approaching or receding from the main frame, still continue in motion without being cramped or checked.

To enable others skilled in the art to make and use my invention, I will proceed to describe the same with reference to the drawings.

A represents a main frame carried by a pair of supporting and driving wheels, B, on independent axles, or on a common axle, as may be desired. On the wheels B are placed cog-gears C, which work into pinions on a common shaft, said pinions being furnished with a pawl and ratchet or spring-clutch each, so that one of the wheels may be loose when the machine is backed. From this pinion-shaft the cutter-bar is worked, by the ordinary well-known mechanical appliances, by means of a pitman, D. At the front of the main frame, on the grain side thereof, is pivoted by a swivel-joint, E, the front end of a bar, F, the rear end whereof inclines downward and may terminate in a shoe, which rests upon the ground. The rear end of the bar F, or its shoe, is connected to the main frame at or near its rear by a hinged brace-bar, G. The finger-bar H is connected to the bar F at or near its rear end, and can rise and fall with said bar F, which is hinged at $a$, and the bar F can rock and roll on its swivel-joint E also, so that there is nothing to cramp the free rising and falling of the finger-bar as it yields to the inequalities of the ground. Should a platform be used, it is connected to the finger-bar, and it also, as well as the reel, (as will be described,) can all rise and fall and still maintain the same relative positions to each other.

One of the reel-posts, I, is set upon the bar F, and the other, J, is attached to the outside divider, K; but this latter may be connected at any other convenient point or part at the outer end of the platform or finger-bar. The reel-shaft L is hung in these posts I J, and is adjustable therein, so as to be raised and lowered to adapt the reel to taller or shorter straw or stalks. Near the lower end of the reel-post I there is a box or bearing, M, adjustable in the slot $b$, and in this bearing is hung a shaft, $c$, carrying a pulley, N, and from this pulley N an endless belt passes over and around a pulley, $o$, on the reel-shaft, by which the reel is driven.

The end of the main axle next the cutting apparatus and the end of the small pulley-shaft c next the main frame may be made square or many-sided, so as to receive the square or many-sided pods d e, Fig. 2, on the ends of the toggle-link P. The central portion, P, of this toggle-link is connected to the pods or sockets d e through universal joints f g, so that the two shanks of the main axle and of the pulley-shaft may have any positions that the irregularities of the ground may give to them, and yet this toggle-link will continue to drive the pulley-shaft whenever the axle turns. The shanks (one of which is shown at h, Fig. 2) are long enough to allow them to play through their pods or sockets d e, but without slipping out or disconnecting therewith. The universal joints f g allow the toggle-connection to assume almost any shape, while it continues as constantly and uninterruptedly to drive the reel as though it were rigid and non-flexible. I thus get a very simple and very efficient means of transmitting motion across the hinged joint by which the finger-bar is connected to the main frame, which is yielding in its character, but as constant in its operation as though no joint were used.

I have said that the shank was on the end of the main axle. Now, it is obvious that in machines where the supporting or driving wheel or wheels are on the outside of the frame and the wheel or wheels on the outer ends of the axle, this shank may be upon the end of the hub of the wheel instead of the end of the axle, and accomplish a similar purpose; and by showing this connection with a machine like that in the drawings I do not mean to confine myself exclusively to such a machine, as it may be applied to many others differing from it.

Having thus fully described my invention, what I claim is—

In combination with a harvesting-machine that has its finger-bar hinged to the main frame, and whose reel is operated from the main drive-wheels, a toggle-link connection between said drive-wheels or axle and the reel-shaft, so that the finger-bar and its appliances may be free to rise and fall in conforming to the inequalities of the ground over which it is passing, and continue to be driven without cramping, substantially as described.

LEWIS MILLER.

Witnesses:
ISAAC HAZLETT,
WM. BARBER.